2,898,177
PROCESS FOR THE PRODUCTION OF DYESTUFFS ON THE FIBER

Georg Rösch, Leverkusen, Helmut Klappert, Koln-Stammheim, Walther Wolf, Leverkusen, and Johannes Eibl, Koln-Stammheim, Germany, assignors to Farbenfabriken Bayer Aktiengesellschaft, Leverkusen, Germany, a corporation of Germany No Drawing. Application October 25, 1955
Serial No. 542,758

Claims priority, application Germany October 28, 1954

6 Claims. (Cl. 8—34)

This invention relates to a novel process for the dyeing of fibers.

It is known to produce dyestuffs having good fastness properties which may be employed as vat dyestuffs by prolonged heating of naphthalene tetracarboxylic acid with o-phenylene diamine in solvents such as nitrobenzene or glacial acetic acid as described in German patent specification No. 430,632.

It is an object of the present invention to provide a novel process for producing this and similar dyestuffs of the naphthal-arylimide series, alkylimide or naphthalo perinone series on the fiber. Another object is to provide a dyeing process for dyestuffs which cannot be used by the customary dyeing processes in view of their insolubility. Further objects will appear hereinafter.

These objects are attained in accordance with the present invention by applying to or printing on the fiber a peridicarboxylic acid or a peritetracarboxylic acid and an o-diamine, a peridiamine or a monoamine from an aqueous solution, and by subsequently subjecting it to a heat treatment in the presence of a condensing agent.

As peridicarboxylic acid there may be used for example naphthalene-1,8-dicarboxylic acid and its substitution products, 1,4,5,8-naphthalene tetracarboxylic acid, 3,4,9,10-perylene tetracarboxylic acid and corresponding compounds which contain at least two carboxyl groups in peri-position, such as for example 1,2-benzanthraquinone-3,4'-dicarboxylic acid (I), 2,8',8,2'-dioxydo-1,1-dinaphthyl-4,5,4',5'-tetracarboxylic acid (II) or 1,2,2'1',-dinaphthazine-4,5,4',5'-tetracarboxylic acid (III) as well as their substitution products.

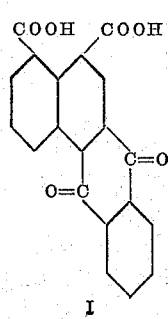

I

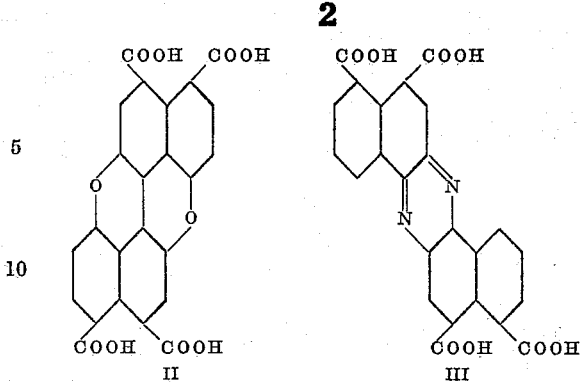

II  III

Dicarboxylic acids suitable for the process according to the invention are also compounds which are further substituted. As examples of this kind there may be mentioned the following azo dyestuffs which are obtained by coupling of diazotized, 3-aminonaphthalene-1,8-dicarboxylic acid with the arylamides of 2-hydroxynaphthalene-3-carboxylic acid (IV) or of acetoacetic acid (V).

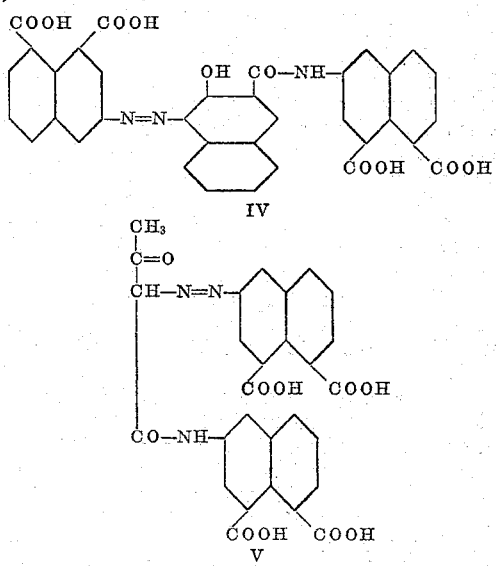

IV

V

Furthermore dyestuffs formed for example by coupling of diazotized amines with hydroxynaphthalene-1,8-dicarboxylic acid (VI) or azo compounds obtained by oxidation of the aminonaphthalene-1,8-dicarboxylic acid such as for example 3,3'-azodinaphthalene-1,8,1',8'-tetracarboxylic acid (VII).

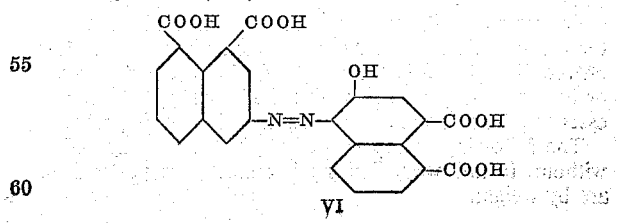

VI

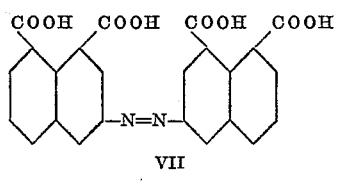

VII

As diamines there may be used o-phenylene diamine and its substitution products as well as peridiamines of the 1,8-naphthylene diamine type or their substitution products. In the case of o-phenylene diamine there are obtained dyestuffs of the naphthoylene arylimidazole series (VIII), and in the case of the peridiamine dyestuffs of the naphthalo perinone series (IX).

Suitable primary monoamines are for example: ethanolamine and aniline which yield on condensation with a peridicarboxylic acid dyestuffs of the naphthalimide series (X).

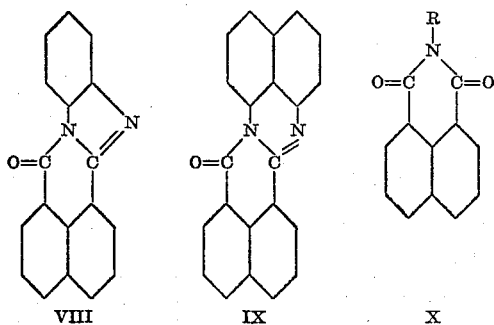

VIII  IX  X

In order to carry the process according to the invention into effect, the two components in the form of their ammonium or alkali salts are dissolved in water, if necessary, with the aid of a small addition of a solvent such as thio-diglycol, glycol monomethyl ether, glycerol or diglycol. As a condensing agent there may be added an acid; it is advantageous to use a slowly evaporating organic acid, such as lactic acid or glycollic acid. Good results were also obtained with sulphoacetic acid, methane disulphonic acid, benzene sulphonic acid and phosphoric acid, which may be used alone or in admixture with lactic acid or glycollic acid. It is expedient to use the ammonium salts of these acids. By using a slowly evaporating liquid acid and slowly evaporating solvents too rapid a drying of the reaction components applied to the fiber can be obviated in the subsequent heat treatment which would detrimentally affect the dyestuff formation.

The solution of the reaction components is then padded or printed after the addition of a thickener on cotton, spun rayon or rayon, preliminarily dried, and then at temperatures of between 60 and 140° C. either condensed in the dry state or steamed with acid or neutral steam. The formation and fixation of the dyestuff thereby takes place on the fiber, and dyeings of very good fastness properties are obtained after conventional after-treatment.

Addition of a strong amine such as for example diethylene triamine completely prevents the dyestuff formation so that resists may be obtained.

The process according to the invention enables one to produce and to fix dyestuffs on the fiber, which until now could not be used for the dyeing of textiles because of their low solubility or insolubility. It is surprising that the condensation of the two components into the dyestuff on the fiber proceeds smoothly by a brief heat treatment or by a steaming process, whilst the hitherto known processes require a prolonged boiling in a high boiling solvent.

The following examples further illustrate the invention without, in any way, limiting it thereto; the parts given are by weight.

Example 1

3.04 parts of 1,4,5,8-naphthalene tetracarboxylic acid are dissolved in a solution of:

20.00 parts of water, and
3.00 parts of 25% ammonia

There are then successively stirred in:

4.00 parts of thiodiglycol
4.00 parts of diglycol monomethyl ether
4.30 parts of o-phenylenediamine
21.40 parts of aqueous 40% ammonium lactate
35.00 parts of tragacanth thickener (65:1000), and
5.26 parts of water The printing composition thus obtained is printed on cotton, viscose rayon, spun rayon or acetate rayon. After usual preliminary drying the dyestuff is produced on the fiber by acid or neutral steaming or by heating to 120–130° C. After conventional soaping, beautiful, clear red prints are obtained having excellent fastness properties.

In the preparation of the printing paste there may be used instead of a solution of ammonium acetate, solutions of the ammonium salts of phosphoric acid, sulfoacetic acid, methane disulfonic acid, sulfobenzoic acid, benzene or toluene sulfonic acid. The ratios may be varied within wide limits or there may be used mixtures of the ammonium salts of these acids with ammonium lactate or the ammonium salt of glycollic acid.

Example 2

4.5 parts of the dipotassium salt of the naphthoylene benzimide azole dicarboxylic acid are dissolved in 20.0 parts of water. Successively the following components are added:

2.0 parts of 1,2-phenylene diamine
45.0 parts of tragacanth (65:1000)
5.5 parts of 88% phosphoric acid
8.5 parts of 25% aqueous ammonia solution
7.0 parts of diglycol monomethyl ether and
7.5 parts of water By using this printing paste according to the procedure of Example 1, a clear red dye is obtained on the fiber which is identical with the one obtained by the procedure of Example 1.

Example 3

3.10 parts of 1,4,5,8-naphthalene tetracarboxylic acid are dissolved in a solution of 20.00 parts of water, and
3.00 parts of 25% ammonia There are then successively stirred in 8.00 parts of diglycol monomethyl ether
7.00 parts of thiodiglycol
3.75 parts of 3-methyl-1,2-phenylene diamine
16.10 parts of 40% ammonium lactate solution
35.00 parts of tragacanth thickener (65:1000) and
4.05 parts of water This printing composition produces on the fiber as described in Example 1 beautiful brownish red shades having good fastness properties.

When replacing the 3-methyl-1,2-phenylene diamine by the equivalent amount of 4-methyl-1,2-phenylene diamine, brownish red shades are obtained on the fiber in which the brown is more pronounced than with the 3-methyl compound.

When replacing the 3-methyl-1,2-phenylene diamine by the equivalent amount of 4-ethoxy-1,2-phenylene diamine hydrochloride a brown having good fastness properties is obtained. When replacing the 3-methyl-1,2-phenylene diamine by the equivalent quantity of 4-methoxy-1,2-phenylene diamine hydrochloride, a yellowish brown shade is produced on the fiber having very good fastness properties.

Example 4

31.00 parts of naphthalene-1,4,5,8-tetracarboxylic acid are dissolved in a solution of 20.00 parts of water and
30.00 parts of 25% ammonia There are then successively stirred in 70.00 parts of thiodiglycol
80.00 parts of diglycol monomethyl ether
31.00 parts of o-phenylene diamine
214.00 parts of 40% ammonium lactate solution and
524.00 parts of water Cotton, viscose rayon or staple fiber is padded with this solution. After conventional pre-drying the dyestuff is produced on the fiber by heating to 120–130° C., or by acid or neutral steaming. After soaping a beautiful clear and fast red shade is obtained.

Example 5

3.04 parts of 1,4,5,8-naphthalene tetracarboxylic acid are dissolved in a solution of 14.00 parts of water and
3.00 parts of 25% ammonia There are then successively stirred in 7.00 parts of thiodiglycol
8.00 parts of diglycol monomethyl ether
4.74 parts of 1,8-naphthalene diamine
35.00 parts of tragacanth thickener (65:1000)
24.40 parts of 40% ammonium lactate solution and
0.82 parts of water The composition thus obtained is printed on cotton, viscose rayon, staple fiber or acetate rayon. After conventional pre-drying the dyestuff is produced on the fiber by acid steaming or by heating to 120–130° C. After conventional soaping there are obtained navy blue prints of good fastness properties.

Example 6

4.4 parts of naphthalic acid are dissolved in a solution of 20 parts of water and 5.0 parts of 25% ammonia.
Then there are successively stirred in 40.0 parts of tragacanth (65:1000)
4.5 parts of 4-ethoxy-1,2-phenylene diamine hydrochloride
2.0 parts of thiodiglycol
2.0 parts of diglycol monomethyl ether
4.0 parts of lactic acid
8.5 parts of 25% ammonia and
9.6 parts of water With this printing composition there is developed on the fiber a fast yellow shade as indicated in Example 1.

By using instead of the naphthalic acid the equivalent amount of 4-bromo-naphthalic acid or 4,5-dichloro-naphthalic acid or 3-nitro-naphthalic acid, clear and fast yellow dyes are obtained on the fiber.

Example 7

5.9 parts of the dipotassium salt of the 4-benzoyl naphthalic acid are dissolved in 20 parts of water. Then there are successively stirred in 2.5 parts of o-phenylene diamine
7.0 parts of diglycol monomethyl ether
40.0 parts of tragacanth thickener (65:1000)
5.0 parts of 88% phosphoric acid
6.5 parts of 25% ammonia and
13.1 parts of water By using this printing paste in accordance with Example 1, a very clear and fast greenish-yellow dye is obtained on the fiber.

By using instead of the dipotassium salt of the 4-benzoyl naphthalic acid equivalent amounts of the dipotassium salt of 4-(2',5'-dichloro benzoyl)-naphthalic acid or equivalent amounts of the tetra potassium salt of a tetra carbonic acid which is obtained by reacting 2 mols of acenaphthene with 1 mol of isophthalyl chloride by Friedel-Crafts reaction and subsequent oxidation of the diketones formed with sodium bichromate in glacial acetic acid, very clear and fast greenish-yellow dyeings are obtained as well.

Example 8

6.5 parts of the dipotassium salt of 4-phenylsulfone-naphthalic acid are dissolved in 20 parts of water.
Then there are successively stirred in 2.5 parts of o-phenylene diamine
7.0 parts of diglycol monomethyl ether
40.0 parts of tragacanth (65:1000)
5.0 parts of 88% phosphoric acid
6.5 parts of 25% ammonia and
12.5 parts of water By using this printing paste as described in Example 1, a very clear and fast greenish-yellow dyeing is obtained.

Example 9

4.6 parts of the tetra-potassium salt of the 4,4'-dinaphthyl keto-1,8,1',8'-tetracarbonic acid are dissolved in 15 parts of water.

Then there are successively stirred in 3.9 parts of the hydrochloride of 6-methyl-1,2-phenylene diamine
50.0 parts of tragacanth thickener (65:1000) or wheat starch tragacanth
9.6 parts of lactic acid
12.0 parts of 25% ammonia
3.0 parts of diglycol monomethyl ether and
1.9 parts of water By using this printing paste as described in Example 1, a clear and fast golden yellow dyeing is obtained on the fiber.

By using instead of the hydrochloride of the 6-methyl-1,2-phenylene diamine the equivalent amount of the hydrochloride of 4,6-dimethyl-1,2-phenylene diamine, a golden orange dyeing is obtained.

Example 10

3.9 parts of the dipotassium salt of 4-phenoxy naphthalic acid are dissolved in 20 parts of water. Then there are successively stirred in 20.0 parts of the hydrochloride of 6-methyl-1,2-phenylene diamine
50.0 parts of tragacanth thickener (65:1000)
4.8 parts of lactic acid
6.0 parts of 25% ammonia
3.0 parts of diglycol monomethyl ether and
10.3 parts of water By using this printing paste as described in Example 1, a clear greenish yellow is obtained on the fiber.

Example 11

3.0 parts of the tetra-potassium salt of 3,4'-dinaphthyl-ether-1,8,1',8'-tetracarbonic acid are dissolved in 20 parts of water. Then there are successively stirred in 2.5 parts of the hydrochloride of 6-methyl-1,2-phenylene diamine
50.0 parts of tragacanth thickener (65:1000)
4.8 parts of lactic acid
6.0 parts of 25% ammonia
3.0 parts of diglycol monomethyl ether and
10.7 parts of water By using this printing paste as described in Example 1, a clear greenish-yellow dyeing is obtained.

Example 12

2.6 parts of the dipotassium salt of 4-pyrazol-anthronyl-naphthalic acid, obtained by heating the potassium salt of pyrazol anthrone with 4-bromo-naphthalic acid anhydride in nitrobenzene at 210° C., are dissolved in 20 parts of water. Then there are successively stirred in:

1.5 parts of 6-methyl-1,2-phenylene diamine
4.0 parts of diglycol monomethyl ether
50.0 parts of tragacanth thickener (65:1000)
3.0 parts of lactic acid
4.0 parts of 25% ammonia and
14.9 parts of water By using this printing paste as described in Example 1, a clear yellow dyeing is obtained on the fiber.

Example 13

4.1 parts of the dipotassium salt of the oxazol peridicarbonic acid, which is obtained by reacting 3-hydroxy-4-aminonaphthalic acid anhydride with benzoyl chloride in nitrobenzene at 210° C., are dissolved in 20 parts of water. Then there are successively stirred in:

1.5 parts of 6-methyl-1,2-phenylendiamine
4.0 parts of diglycol monomethyl ether
50.0 parts of tragacanth thickener (65:1000)
3.0 parts of lactic acid
4.0 parts of 25% ammonia and
12.4 parts of water By using this printing paste as described in Example 1, a very clear and strong yellow dyeing is obtained on the fiber.

By using instead of the dipotassium salt of the oxazol peridicarbonic acid 3.6 parts of the tetra-potassium salt of the bis-oxazol peritetracarbonic acid, which is obtained by reacting 2 mols of 3-hydroxy-4-aminonaphthalic acid anhydride with 1 mol of isophthalyl chloride in nitrobenzene at 210° C., a clear greenish-yellow dyeing is obtained on the fiber.

Example 14

4.4 parts of the dipotassium salt of benzanthraquinone peridicarbonic acid (obtained according to Graebe, Annalen der Chemie, vol. 327, page 101) are dissolved in 20 parts of water. Then there are successively stirred in:

1.5 parts of 1,2-phenylene diamine
6.0 parts of diglycol monomethyl ether
40.0 parts of tragacanth thickener (65:1000)
4.0 parts of lactic acid
6.0 parts of 25% ammonia and
18.1 parts of water By using this printing paste as described in Example 1, a clear and fast orange dyeing is obtained on the fiber.

Example 15

4.0 parts of the dipotassium salt of benzanthrone peridicarbonic acid (obtained according to German patent specification No. 494,111) are dissolved in 20 parts of water. Then there are successively stirred in:

1.5 parts of 1,2-phenylene diamine
6.0 parts of diglycol monomethyl ether
40.0 parts of tragacanth thickener (65:1000)
4.0 parts of lactic acid
6.0 parts of 25% ammonia and
18.5 parts of water By using this printing paste as described in Example 1, a clear and fast orange dyeing is obtained on the fiber.

Example 16

4.3 parts of perylene tetracarboxylic acid are dissolved in a solution of 20 parts of water and 7.5 parts of ethanol amine. Then there are successively stirred in:

5.0 parts of thiodiglycol
35.0 parts of tragacanth thickener (65:1000)
7.2 parts of lactic acid and
21.0 parts of water With this printing paste as indicated in Example 1 there is developed on the fiber a fast wine-red shade.

Example 17

2.1 parts of perylene tetracarboxylic acid are dissolved in a solution of 12.0 parts of water and 2.3 parts of ammonia. Then there are successively stirred in:

7.0 parts of thiodiglycol
45.0 parts of tragacanth thickener (65:1000)
1.5 parts of o-phenylene diamine
7.0 parts of diglycol monomethyl ether
12.0 parts of 40% ammonium lactate solution and
11.1 parts of water With this printing paste there is produced on cotton, viscose rayon or staple fiber after conventional pre-drying and subsequent heating to 125° C. a violet shade having good fastness properties.

Example 18

4.60 parts of 3,3'-azodinaphthalene-1,8,1',8'-tetracarboxylic acid, produced by osidation of 3-amino-naphthalic acid with the aid of sodium hypochlorite at 40° C., are dissolved in a solution of 18.00 parts of water and 5.00 parts of 25% ammonia. Then there are successively stirred in:

40.00 parts of tragacanth thickener (65:1000)
4.00 parts of thiodiglycol
4.0 parts of diglycol monomethyl ether
3.0 parts of 1,2-phenylene diamine and
21.40 parts of 40% ammonium lactate solution With this printing composition there are developed on the fiber clear and fast orange shades according to Example 1.

When replacing in this example the 1,2-phenylene diamine by the equivalent quantity of 4-ethoxy-1,2-phenylene diamine, a fast brownish orange shade is obtained.

When replacing the 3,3'-azodinophthalene-1,8,1',8'-tetracarboxylic acid by the equivalent quantity of 1,2,1',2'-dinaphthazine-4,5,4',5'-tetracarboxylic acid (produced by oxidation of 3-amino-naphthalic acid by means of sodium hypochlorite at 90° C.; the acid dissolves in concentrated sulfuric acid with a violet blue color and forms on reduction a blue dihydroazine), a very clear and fast orange shade is obtained on the fiber.

Example 19

4.8 parts of the azo dyestuff obtained by coupling of diazotized 3-amino-naphthalic acid on 3-hydroxy naphthalic acid, are dissolved in a solution of 20 parts of water and 5.0 parts of ammonia. Then there are successively stirred in:

45.0 parts of tragacanth thickener (65:1000)
3.5 parts of 1,2-phenylene diamine
4.0 parts of thiodiglycol
4.0 parts of diglycol monomethyl ether
12.0 parts of 40% ammonium lactate solution and
1.7 parts of water With this printing composition there is produced on the fiber a very full and fast reddish-brown shade according to Example 1.

When replacing in this example the aforesaid azo dyestuff by the equivalent quantity on an azo dyestuff produced by coupling of diazotized 3-amino-naphthalic acid on the acyl amide from 2-hydroxy naphthalene-3-carboxylic acid and 3-amino-naphthalic acid, a full wine red shade is obtained on the fiber.

Example 20

4.00 parts of dinaphthylene-dioxide-tetracarboxylic acid are dissolved in a solution of 20 parts of water and 7.00 parts of 25% ammonia. Then there are successively stirred in:

7.00 parts of thioglycol
8.00 parts of diglycol monomethyl ether
3.80 parts of o-phenylene diamine
45.00 parts of tragacanth thickener (65:1000)
4.50 parts of lactic acid and
0.70 part of water With this printing paste there is produced according to Example 1 a full brown shade on the fiber having good fastness properties.

Example 21

70 parts of wheat starch tragacanth and British gum in the ratio of 2:1 are stirred with 15 parts of diethylene triamine and 15 parts of water.

With this white resist there is printed an optional ornament on cotton, viscose rayon or staple fiber and the fabric is then preliminarily dried. The goods thus treated are now padded with a padding solution prepared as described in Example 4.

When dry, a white ornament is obtained on a beautiful clear red base by heating to 120–130° C. or by acid or neutral steaming and by conventional soaping.

In a similar manner color resists may be produced.

We claim:

1. A process for the manufacture of a dyestuff of the naphthoylene-aryl-imidazole series, naphthalo-perinone series and of the naphthal-arylimide on cellulosic and regenerated cellulosic textile fibers, which comprises (a) treating said textile fibers with a mixture consisting of (1) a peri-dicarboxylic acid selected from the group consisting of naphthalene-1,8-dicarboxylic acid, perylene-peridicarboxylic acids, chloro-substituted-naphthalene-1,8-dicarboxylic acid, bromo-substituted-naphthalene-1,8-dicarboxylic acid, nitro-substituted-naphthalene-1,8-dicarboxylic acid, naphthalene-1,4,5,8-tetracarboxylic acid, benzoyl-naphthalene-1,8-dicarboxylic acid, chloro-benzoyl-naphthalene-1,8-dicarboxylic acid, phenylsulfonyl-naphthalene-1,8-dicarboxylic acid, phenoxynaphthalene-1,8-dicarboxylic acid, phenoxazol-naphthalene-1,8-dicarboxylic acid, naphthalene-1,8-dicarboxylic acid-benzimideazole, dinaphthyl-keto-1,8,1',8'-tetracarboxylic acid, dinaphthyl-ether-1,8,1',8'-tetracarboxylic acid, dinaphthyl-phthaloyl-1,8,1',8'-dicarboxylic acid, 4-pyrazol-anthronyl-naphthalene-1,8-dicarboxylic acid, benzanthraquinone-peri-dicarboxylic acid, benzanthrone - peri - dicarboxylic acid, azo-dinaphthalene-1,8,1',8'-tetracarboxylic acid, dinaphthazine - 1,8,1',8' - tetracarboxylic acid, arylazohydroxynaphthalene-1,8-dicarboxylic acid, 3'-arylamido-2'-hydroxynaphthalene - azonaphthalene - 1,8 - dicarboxylic acid, aryl acetoacetamido-azo-naphthalene-1,8-dicarboxylic acid, as an alkali salt thereof; (2) a member selected from the group consisting of o-phenylene diamine, lower alkyl-substituted o-phenylene diamines, lower alkoxy-substituted o-phenylene diamines and 1,8-naphthalene diamine; and (3) a condensing agent; and (b) subjecting said textile fibers thus treated to a heat treatment.

2. The process of claim 1 wherein a thickening substance is incorporated in the mixture.

3. The process of claim 1 wherein the condensing agent is a member of the group consisting of lactic acid, glycollic acid, methane disulfonic acid, benzene sulfonic acid, phosphoric acid and ammonium salts thereof.

4. Process according to claim 1, in which the heat treatment is carried out by a steam treatment.

5. The process of claim 1 wherein a water-miscible solvent selected from the group consisting of alkane polyols, thiols and their alkyl ethers is incorporated in the mixture.

6. A process of claim 5, wherein the solvent is a member selected from the group consisting of thiodiglycol, glycol monoethyl ether, glycerol and diglycol.

References Cited in the file of this patent

UNITED STATES PATENTS

| 2,266,018 | Fleysher | Dec. 16, 1941 |
| 2,683,643 | Baumann | July 13, 1954 |

FOREIGN PATENTS

| 429,681 | Great Britain | June 4, 1935 |
| 604,014 | Germany | Oct. 12, 1934 |